(No Model.) 2 Sheets—Sheet 2.
E. J. KNAPP.
UNIVERSAL JOINT PIPE CONNECTION.
No. 574,249. Patented Dec. 29, 1896.
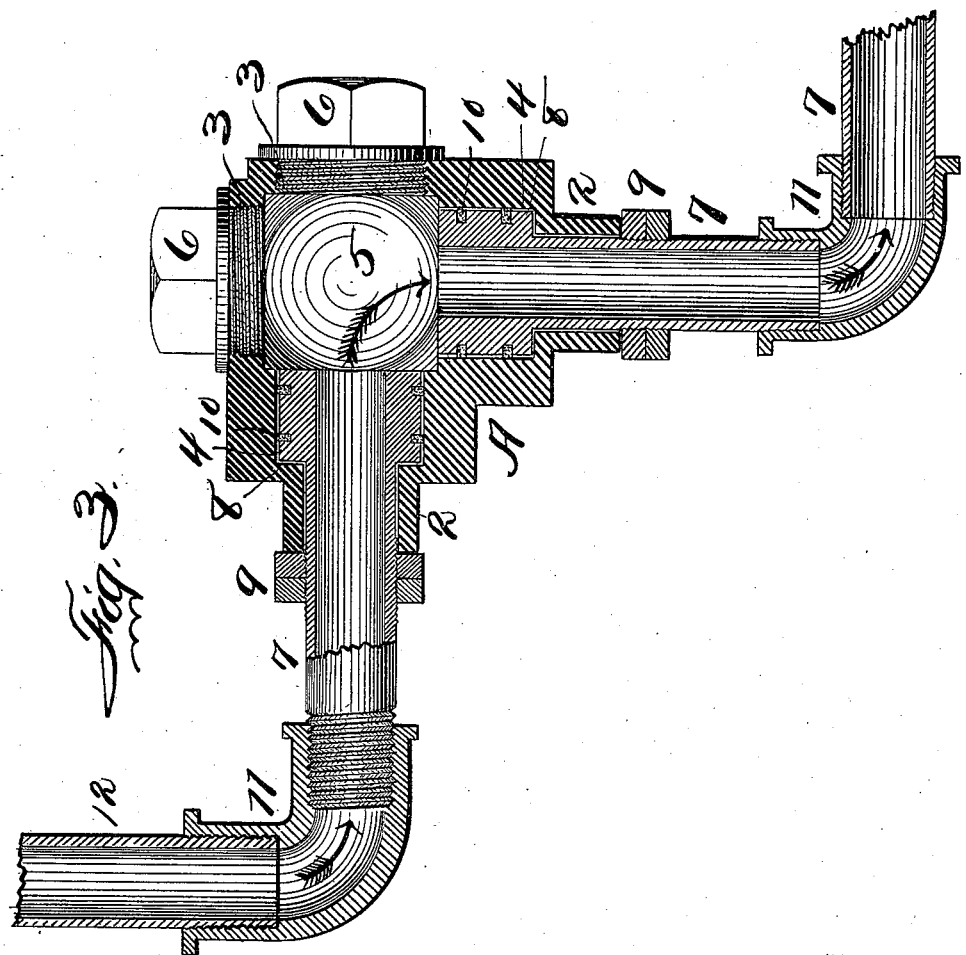
WITNESSES:
INVENTOR
Edward J. Knapp.
BY
ATTORNEYS.

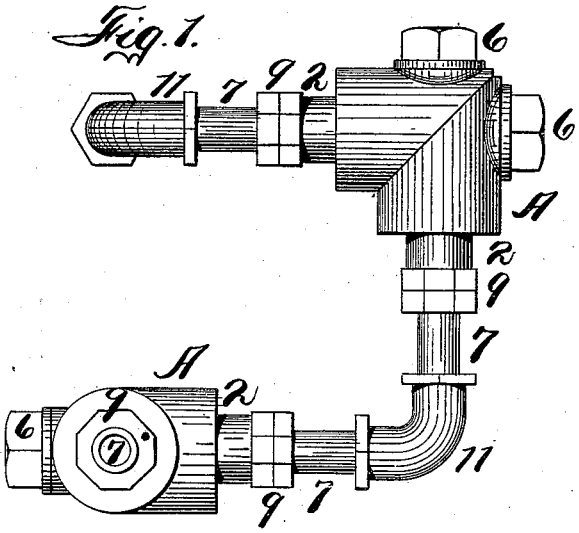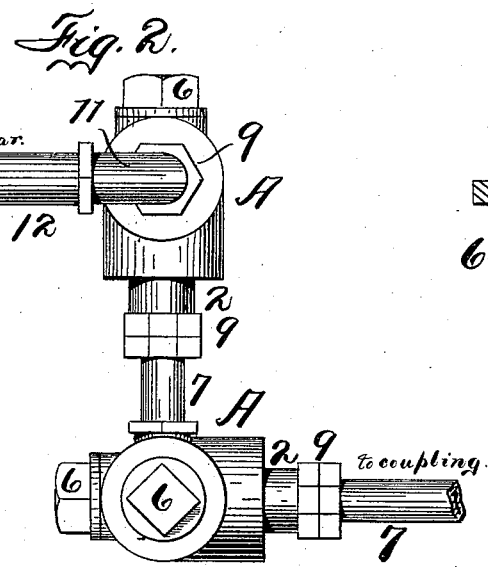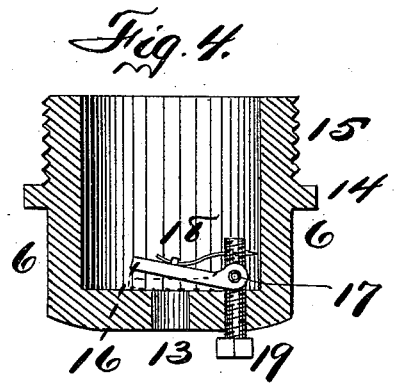

UNITED STATES PATENT OFFICE.

EDWARD J. KNAPP, OF SYRACUSE, NEW YORK, ASSIGNOR TO CHARLES UMBRECHT, TRUSTEE, OF SAME PLACE.

UNIVERSAL-JOINT PIPE CONNECTION.

SPECIFICATION forming part of Letters Patent No. 574,249, dated December 29, 1896.

Application filed March 9, 1896. Serial No. 582,336. (No model.)

*To all whom it may concern:*

Be it known that I, EDWARD J. KNAPP, of Syracuse, in the county of Onondaga, in the State of New York, have invented new and useful Improvements in Universal-Joint Pipe Connections, of which the following, taken in connection with the accompanying drawings, is a full, clear, and exact description.

My invention relates to tubular universal-joint pipe connections designed to be used in situations and for purposes where the pipes are exposed to and receive and have a vertical, swinging, or oscillatory movement, either separately or combined with a longitudinal movement, so that the pipes can occupy and operate in different planes, or the plane of one may be at an angle to that of the other, or one may be vertical and the other horizontal, and by means of a suitable coupling two of said pipes can be detachably connected, so that any liquid or fluid can pass from one pipe to the other.

My object is to produce such a pipe connection adapted to be used for the transmission of hot or cold liquids, gases or vapor, or steam, or for many analogous purposes and under varying degrees of pressure, and constructed so as to permit of universal movement, especially when several of the connections are connected together creating a conduit, and when two of such conduits are coupled together permitting one to be connected to a source of supply in a higher plane than the other and to yield to any vertical or horizontal movement of the object to which it is connected.

It comprises an elbow-shaped double swivel provided with interior valve or swivel seats standing in planes at an angle to each other and created by introducing a boring and facing tool through the sides in line with the bore of each arm of said elbow, suitable tubular pipes having suitable heads to fit said seats and means to adjust their fit in their respective seats. Suitable elbows between the adjacent ends of two of these pipes connect two of these double or angular swivels to create a conduit of any length desired; also by means of a suitable coupling two of these conduits can be connected together. When necessary or essential, means are provided whereby any condensation can be removed by means of an automatically-opened drip in each swivel so as to prevent its freezing.

It is constructed as follows, reference being had to the accompanying drawings, in which—

Figure 1 is a front elevation showing a conduit created by connecting two of said double swivels together. Fig. 2 is a side elevation of the same. Fig. 3 is a vertical section of one of said swivels and part of a conduit. Fig. 4 is a vertical sectional elevation of a drip-plug and an automatically-opened valve adapted to be closed by the pressure of the liquid or fluid passing through the swivel and to open as soon as that pressure is removed.

Inasmuch as the swivels are all of the same construction, only one will be separately described. A is the body of the swivel, in the form of an elbow, the arms 2 of which are suitably bored out. Openings 3 in the sides permit the insertion of a suitable tool to bore out and create a valve and swivel seat 4 in each arm and opening into the chamber 5 in the body, said tool-openings being closed by suitable plugs 6. Tubular rods or pipes 7 are inserted through said openings, so that their heads 8 enter and fit said seats, respectively, and suitable jam-nuts 9 upon said pipes, having a bearing against the end of each arm, regulate the fit of said heads in their seats.

Suitable packing, as 10, make the joints tight, while permitting sufficiently free rotation of one part upon or in the other. These pipes screw into elbows 11, so as to make connection to supply-pipe 12' and to connect one swivel to another by connecting the swivel-pipes, so as to create a conduit.

In Fig. 4 a plug is shown, which can be one of the plugs 6 or an analogous plug let into a side of the swivel A or one of its arms, comprising a concaved body, a discharge-opening 13 in the outer end, an exterior flange 14, a threaded portion 15, a suitable flap 16, hung or pivoted at 17, a spring 18, having one end connected to said flap and the other to the screw 19. This screw is under tension to hold said flap or valve open, and the degree of the opening is regulated by the adjustment of said screw. When one conduit is upon one car and a like conduit is upon another, a suitable coupling connects said conduits, so that, for instance, steam can flow through them from one car or a generator into the adjoining car to heat it.

What I claim as my invention, and desire to secure by Letters Patent, is—

A swivel for a pipe connection consisting of an interiorly-chambered angular body and tubular extensions opening into the body, and plugs fitted therein, seats bored into the extensions and having angular shoulders at their outer ends, pipes inserted into the extensions and having heads fitted in the seats and provided with peripheral packings, and jam-nuts outside the extensions on the pipe for holding the parts in place, substantially as described.

In witness whereof I have hereunto set my hand this 1st day of March, 1896.

EDW. J. KNAPP.

In presence of—
  MAUDE E. COOKE,
  HOWARD P. DENISON.